United States Patent [19]

Domonoske

[11] Patent Number: 5,203,083

[45] Date of Patent: Apr. 20, 1993

[54] CUTTING DEVICE

[76] Inventor: Dean D. Domonoske, 16A/66 Great Eastern Highway, Rivervale, Western Australia, Australia, 6103

[21] Appl. No.: 831,777

[22] Filed: Feb. 5, 1992

[30] Foreign Application Priority Data

Feb. 21, 1991 [AU] Australia ............................ PK 4712

[51] Int. Cl.$^5$ ............................................. B23D 21/06
[52] U.S. Cl. .................................... 30/92; 30/162; 30/335
[58] Field of Search ............ 30/162, 91.2, 90.8, 30/335, 241, 151, 92

[56] References Cited

U.S. PATENT DOCUMENTS

| | | | |
|---|---|---|---|
| 3,106,017 | 10/1963 | Milbrandt | 30/162 |
| 3,192,624 | 7/1965 | Gringer | 30/162 |
| 3,484,940 | 12/1969 | Zell, Jr. | 30/162 |
| 3,906,561 | 9/1975 | Bawa | 30/162 |
| 3,906,627 | 9/1975 | Manning | 30/335 |
| 4,139,939 | 2/1979 | Crooks | 30/162 |
| 4,803,782 | 2/1989 | Lok | 30/162 |
| 4,897,920 | 2/1990 | Dunbar | 30/162 |
| 4,920,645 | 5/1990 | Baudouin | 30/162 |
| 5,018,275 | 5/1991 | Huang | 30/92 |
| 5,031,322 | 7/1991 | Jacoff | 30/162 |
| 5,046,250 | 9/1991 | Huang | 30/241 |
| 5,070,616 | 12/1991 | Chen | 30/92 |

Primary Examiner—Frank T. Yost
Assistant Examiner—Hwei-Siu Payer
Attorney, Agent, or Firm—Reising, Ethington, Barnard, Perry & Milton

[57] ABSTRACT

A cutting device includes a casing. A blade is disposed in the casing and moves between first and second blade positions. A moveable member having a blade guide engages the blade and moves between the first and second positions to control movement of the blade between its first and second blade positions. A compression spring is disposed in the casing for biasing the blade toward the first blade position.

13 Claims, 3 Drawing Sheets

CUTTING DEVICE

The present invention relates to a cutting device. In accordance with one aspect of the present invention there is provided a cutting device characterized in that it comprises:

a casing;

blade means in said casing movable between first and second blade position;

a movable member having blade guide means engaging said blade means and movable between first and second positions to move said blade means between said first and second blade positions; and, resilient means in said casing to bias said blade means toward said first blade position.

The present invention will now be described, by way of example, with reference to the accompanying drawings in which.

Figure 1:
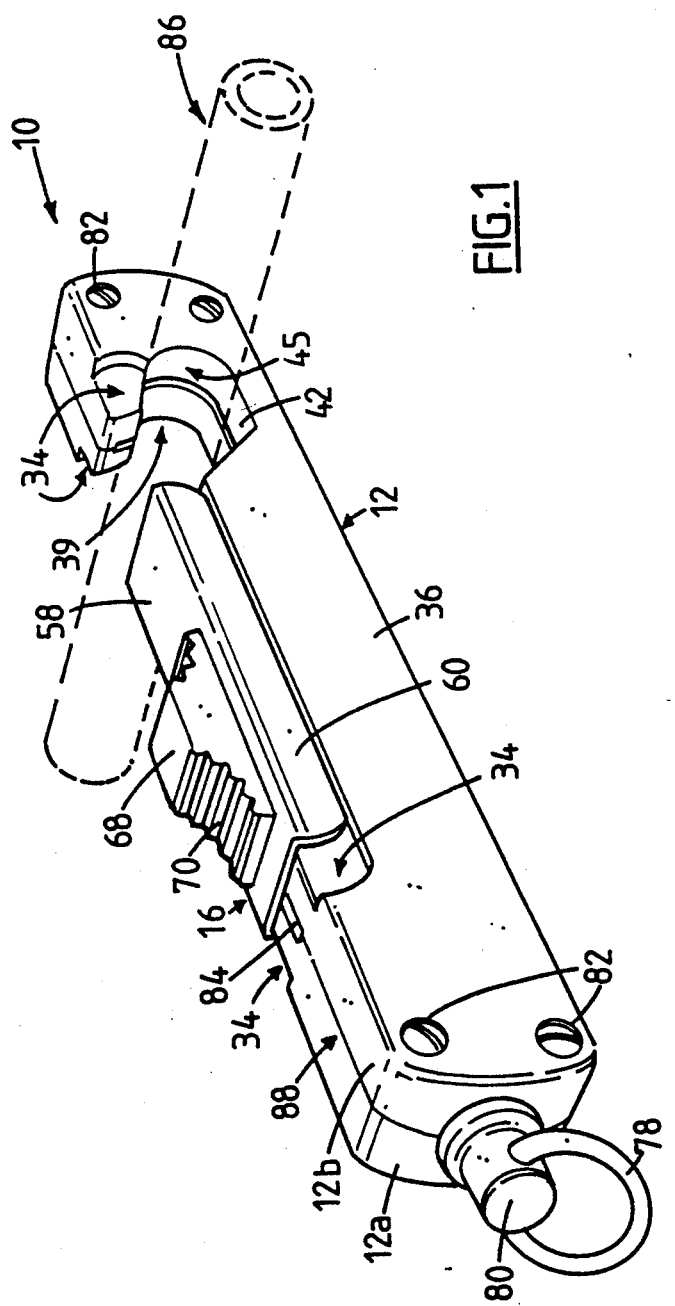
FIG. 1 is a perspective view of an embodiment of a cutting device in accordance with the present invention.
Figure 2:
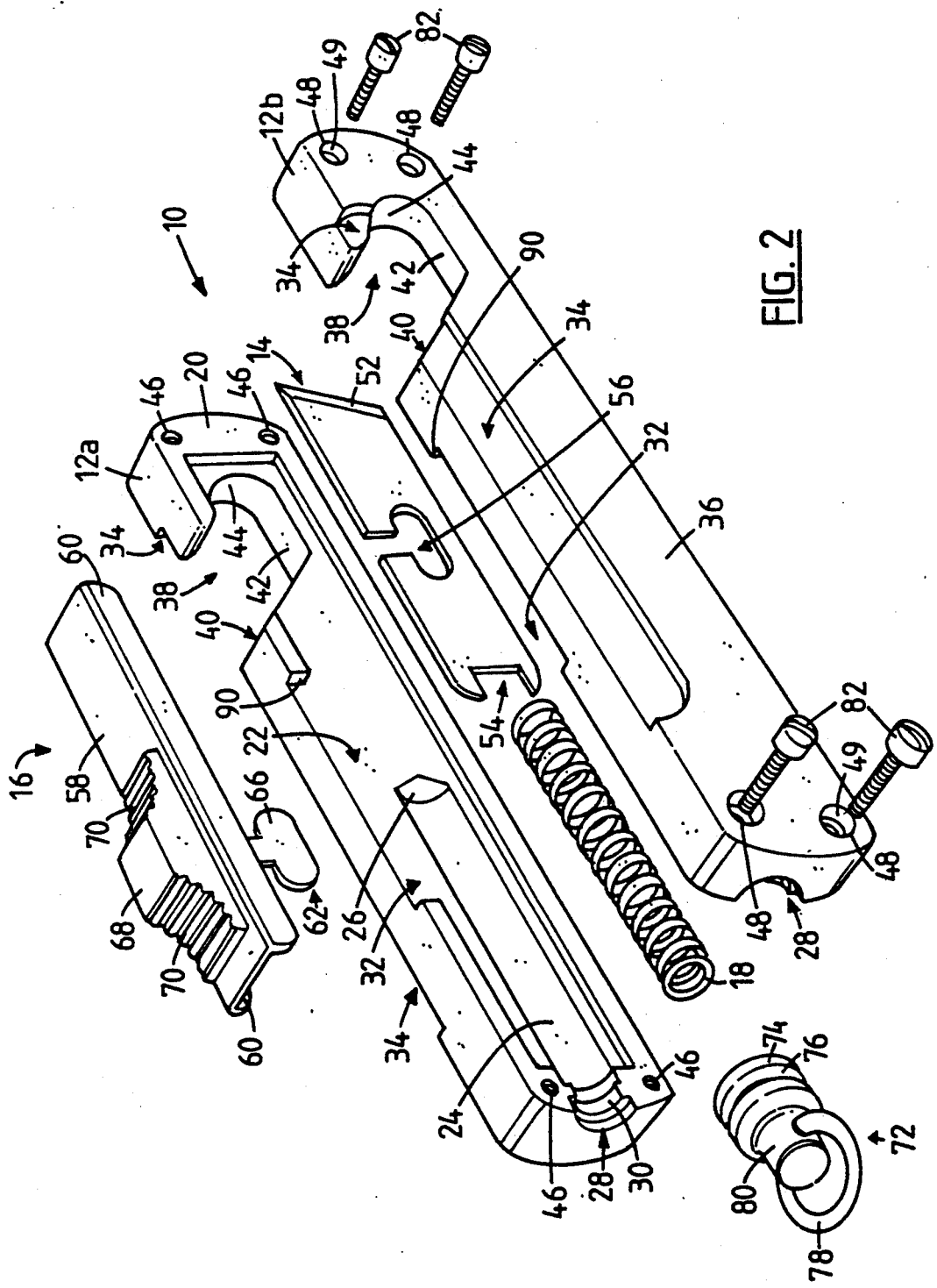
FIG. 2 is an exploded perspective view of the cutting device shown in FIG. 1.
Figure 3:
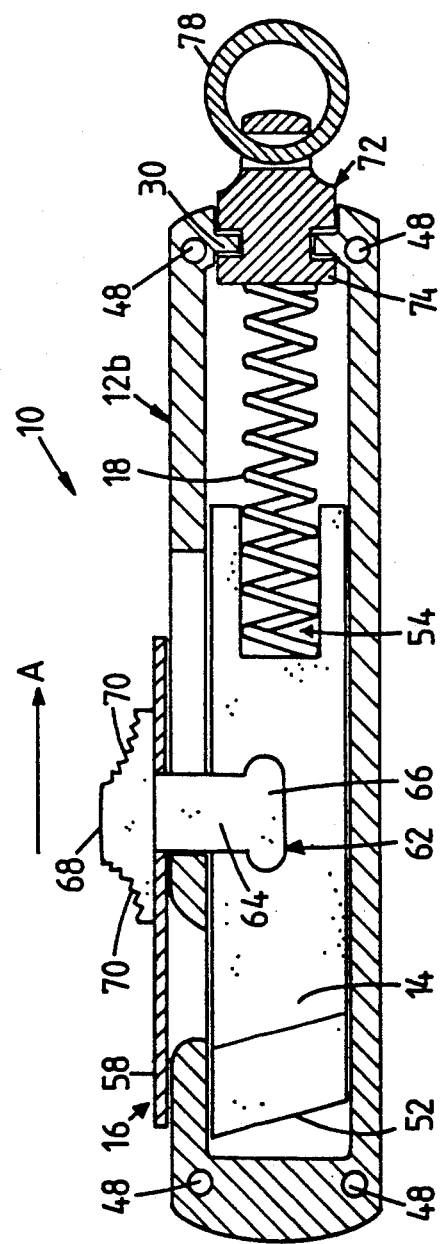
FIG. 3 is a cross-sectional side elevation view of the cutting device shown in FIG. 1.

In FIGS. 1-3, there is shown a cutting device 10 comprising a casing 12, a blade 14, a movable member 16 which engages with the blade 14, and a resilient member in the form of a coil spring 18.

The casing 12 comprises a pair of a casing portions 12a and 12b.

The casing portions 12a and 12b are substantially mirror images of one another.

The casing portions 12a and 12b each has an inside peripheral surface 20. The inside peripheral surfaces 20 of the casing portions 12a and 12b abut when the casing portions 12a and 12b are connected together.

The casing portions 12a and 12b each have a sunken main inside surface 22. The sunken main inside surfaces 22 each have a recess 24 therein. The recesses 24 of the casing portions 12a and 12b each have an end surface 26.

The recesses 24 are substantially semi-cylindrical in form. The recesses 24 extend substantially longitudinally of the casing portions 12a and 12b.

One end of each of the casing portions 12a and 12b is provided with a recess 28 in its inside peripheral surface 20. The recesses 28 are each provided with a flange 30. The recesses 28 and flanges 30 are substantially semicircular in form.

The casing portions 12a and 12b are each provided with a cut-out 32 in their inside peripheral surfaces 20 and a cut-out 34 in their exterior surfaces 36.

The cut-outs 32 and 34 are substantially oblong in form. The cut-outs 32 and 34 extended substantially longitudinally of the casing portions 12a and 12b.

The casing portions 12a and 12b are each provided with a cut-out 38.

A portion of each cut-out 34 is located on the casing portions 12a and 12b on either side of the cut-outs 34.

The cut-outs 38 each has a portion 40 that extends in a sloping manner from the cut-out portions 34, a portion 42 that extends substantially longitudinally of the casing portions 12a and 12b, and a portion 44 that curves away and upwardly from the portion 42.

The inside peripheral surfaces 20 of the casing portion 12a are provided with screw-threaded holes 46 near their corners.

The casing portion 12b is provided with counter bores 48 near their corners. The counter bores 48 have a recess 49 near the exterior surface 36 of the casing portion 12b.

The blade 14 is substantially oblong in shape and has a cutting edge 52 at one end. The cutting edge 52 is sloped and provided with a bevel. This can be seen in FIGS. 2 and 3.

The end of the blade 14 has a cut-out 54.

A cut-out 56 is also provided in the blade 14 between the cutting edge 52 and the cut-out 54.

The movable member 16 comprises a strip portion 58 with an offset depending portion 60 extending from each side thereof.

The movable member 16 also comprises a blade guide member 62 which extends downwardly from the undersurface of the strip portion 58.

The blade guide member 62 comprises a shank 64 which terminates in a knob 66.

The movable member 16 further comprises a knob 68 with serrated surfaces 70. The knob 68 is positioned on the uppermost surface of the strip portion 58.

The movable member 16 extends substantially longitudinally of the cutting device 10.

The cutting device 10 further comprises an end swivel member 72.

The end swivel member 72 comprises a short substantially cylindrical portion 74 having a circumferential groove 76.

A swivel ring 78 extends through an end portion 80 of the end swivel member 72.

The blade 14, blade guide member 62 of the movable member 16, spring 18 and swivel member 72 are positioned between the casing portions 12a and 12b.

The casing portions 12a and 12b are connected together once the above elements are properly positioned (as will be presently described herein) by passing screws 82 through the counter bores 48 of the casing portion 12b and tightening them into the screw-threaded holes 46 of the casing portion 12a. In this way the two casing portions 12a and 12b are securely connected together, but can also be disconnected to insert a new blade 14 when the existing one becomes worn or to remove, sharpen and replace a worn blade 14. The recesses 49 accommodate the heads of the screws 82. When the two casing portions 12a and 12b are brought together to be connected the recesses 24 of the casing portions 12a and 12b become aligned and together form a cylindrical space. The spring 18 is positioned and accommodated in this cylindrical space.

Similarly, the sunken main inside surfaces 22 of the casing portions 12a and 12b become aligned to form an oblong space. The blade 14 is positioned and accommodated in this oblong space. The cut-outs 38 together form a single cut-out 39 of the casing 12, best seen in FIG. 1.

Additionally, the recesses 28 of the casing portions 12a and 12b becomes aligned to form a bore-like space. The flange 30 of the casing portions 12a and 12b is received in the circumferential groove 76 and in this way the end swivel member 72 is retained by the casing 12. This is best seen in FIG. 3.

Further, the cut-outs 32 of the casing portions 12a and 12b become aligned to form a slot opening 84. The blade guide member 62 extends through this slot opening 84 and into the interior of the casing 12.

The strip portion 58 of the movable member 16 sits and is slidable on the upper surface 88 of the casing 12 and the offset depending portions 60 are positioned, accommodated and slidable along the cut-outs 34 in the casing portions 12a and 12b.

Inside the casing 12 (made up of the casing portions 12a and 12b connected together) one end of the spring 18 abuts against an end of the swivel end member 72 and the other end of the spring 18 abuts the cut-out 54 of the blade 14. This can be clearly seen in FIG. 3.

The blade guide member 62 extends through the slot opening 84 formed by the cut-outs 32 of the casing portions 12a and 12b such that the knob 66 of the blade guide member 62 engages inthe cut-out 56 of the blade 14. This can also be seen in FIG. 3. In this way, the movable member 16 engages with the blade 14.

In the normal position, the spring 18 biases the blade 14 to a first positions shown in FIG. 3. In this position the spring 18 is extended and the cutting edge 52 of the blade 14 is covered in the forward portion of the casing 12 beyond the cut-out 39. This is also clearly seen in FIG. 3. In this position, the movable manner 16 is also positioned in a first position.

The blade 14 can be moved to a second position by moving the movable member 16 by way of the knob 68 in the direction A shown by the arrow in FIG. 3. Movement of the movable member 16 in the direction A moves the movable member 16 to a second position an also moves the blade 14 to a second position. The movable member 16 moves the blade 14 to the second position since the knob 66 engages in the cut-out 56 of the blade 14.

In the second positions of the movable member 16 and the blade 14, the spring 18 is compressed. However, the spring still remains in the cylindrical space defined by the recesses 24 of the casing portions 12a and 12b.

As the blade 14 moves from its first extended position to its second retracted position, the blade 14 moves from the forward portion of the casing 12 through the cut-out 39 and into the adjacent portion of the casing 12 behind the sloped portions 40.

If the knob 68 of the movable member 16 is released when the blade 14 and the movable member 16 are in their second positions, the spring 18 acts to move the blade 14 and the movable member 16 back to their first positions which are shown in FIG. 3.

The manner of operation and use of the cutting device 10 of the present invention will now be described. The cutting device 10 may be used to cut cylindrical or rod type articles, such as tubing or hose.

To cut a piece of tubing (or hose) 86, the movable member 16 is slid to its second position such that the spring 18 is compressed an the blade 14 is moved to its second position behind the slope portions 40. The piece of tubing (or hose) 86 that is to be cut is then placed in the cut-out 39. The knob 68 is then released and the movable member and the blade 14 move to their respective first positions under the biasing force of the spring 18. This movement of the blade 14 back to its first position effects cutting of the tubing (or hose) 86. If the biasing force of the spring 18 is not sufficient to cut the tubing (or hose) 86, a suitable manual pressure may be applied to the knob of the movable member 16 to assist in the cutting action. Additionally, the cutting action of the blade 14 may be enhanced by using a rocking action of the blade 14 (by moving the knob 68 back and fourth) and a simultaneous twisting motion of the tubing (or hose) 86.

The biasing force of the spring 18 that returns the blade 14 to its first position assists in making the cut and minimizes the manual effort required for making all cuts. Further, the sloped cutting edge 52 of the blade 14 provides an efficient cutting action since the slope of the cutting edge 52 assists in making the cutting action with a slicing type motion.

The curved portions 44 of the casing portions 12a and 12b provide a suitable curved surface 45 (seen in FIG. 1) against which the tubing (or hose) 86 abuts during the cutting action of the blade 14. The width (in the direction transverse to the movement of the blade 14 between its first and second positions) of this curved surface 45 is sufficient to provide a support against which the tubing (or hose) 86 can abut and also to provide longitudinal stability to the tubing (or hose) 86 during a cutting action such that the longitudinal axis of the tubing (or hose) 86 is transverse to the direction of movement of the blade 14. This is seen in FIG. 1. This produces a quick, clean and straight cut at substantially a right angle of the tubing (or hose) 86, i.e., the tubing (or hose) 86 is cut substantially transversely to its longitudinal axis.

The cutting edge 52 of the blade 14 is not exposed except when the blade 14 is moved between its first position and second position and the cutting edge 52 passes through the cut-out 39 on its passage to or from the portion of the casing 12 behind the sloped portions 40. Further, the strip portion 58 of the movable member 16 extends forwardly of the knob 68 so that it overlies the blade 14 up to substantially the cutting edge 52 of the blade 14. This can be clearly seen in FIG. 3. These features ensure a safe operation of the cutting device 10 by minimizing the exposure of the cutting edge 52 of the blade 14. The cutting edge 52 of the blade 14 does not come into contact with any surface except for the tubing (or hose) 86 during a cutting operation. As can be seen in FIG. 3, in the first position of the blade 14 the cutting edge 52 does not abut against the inside surface of the casing 12. This is because in the first position of the blade 14, and also the first position of the movable member 16, the shank 64 of the blade guide member 62 abuts with the forward surfaces 90 of the cut-outs 32 of the casing portions 12a and 12b that form the slot opening 84 preventing further forward movement of the blade 14. This can be also clearly seen in FIG. 3. This arrangement ensures a long blade life.

The cutting device 10 of the present invention is suitable for both rigid and semi-flexible tubing or hose in a wide range of plastics or rubber material. The cutting device 10 is able to cut small diameter tubing, for example, up to 14.3 mm (outside diameter), and larger size cutting capacity is also possible.

The blade 14 can be easily replaced by disconnecting the casing portions 12a and 12b, removing the old blade 14 and inserting a new one. The casing portions 12a and 12b can then be reconnected together. This has been previously herein described.

The blade 44 is preferably made of metal and the remainder of the cutting device 10 may be made of metal and/or plastics, as is most suitable.

Modifications and variations such as would be apparent to a skilled addressee are deemed to be within the scope of the present invention.

I claim:

1. A cutting device for cutting a tubular member comprising:
   a casing;
   blade means in said casing, said blade means having a cutting edge and being movable between first and second blade positions;
   a movable member having blade guide means engaging said blade means and movable between first and second positions to move said blade means between said first and second blade positions;
   resilient means in said casing to bias said blade means toward said first blade position; and
   said casing provided with cut-out means to accommodate said tubular member to be cut, said cut-out means having a curved surface for supporting said tubular member transversely with respect to the direction of the movement of said blade means, whereby said tubular member may be placed in said cut-out means when said blade means is in said second blade position, and said tubular member is cut when said blade means is in said first blade position such that said cutting edge of said blade means passes through said cut-out means as it moves from said second blade position to said first blade position and said tubular member is cut substantially transversely to its longitudinal axis.

2. The cutting device according to claim 1, wherein said blade guide means comprises shank means for preventing the cutting edge of said blade means from contacting said casing at said first and second blade positions and during travel between said first and second blade positions.

3. The cutting device according to claim 1, wherein said casing comprises a slot opening and said blade guide means extends through said slot opening into said casing to engage with said blade means.

4. The cutting device according to claim 3, wherein said blade guide means comprises shank means and said shank means abuts a wall of said slot opening;

5. The cutting device according to claim 1, wherein said blade guide means comprises knob means, said blade means comprises cut-out means and said knob means engages in said cut-out means of said blade means.

6. The cutting device according to claim 1, wherein said a first end of said resilient means abuts with said blade means and a second end of said resilient means abuts with an end member retained by said casing.

7. The cutting device according to claim 1, wherein said casing comprises first and second casing portions which are removably connected together and which are substantially mirror images of one another.

8. The cutting device according to claim 7, wherein said first and second casing portions are each provided with a recess, said recesses defining a space to accommodate said resilient means when said first and second casing portions are connected together.

9. The cutting device according to claim 7, wherein said casing portions are each provided with a sunken inside surface, said sunken inside surfaces accommodating said blade means.

10. The cutting device according to claim 1, wherein said movable member comprises a strip-like member a knob means positioned exterior of said casing and said strip-like member extends to substantially the cutting edge of said blade means such that when said blade means is in said first blade position said strip-like member extends over said cut-out means and when said blade means is in said second blade position said cut-out means is uncovered.

11. The cutting device according to claim 10, wherein said strip-like member has side portions which depend from respective sides thereof in an offset manner and are accommodated in cut-out portions provided on respective sides of said of said casing.

12. The cutting device according to claim 1, wherein said casing comprises plastics material.

13. The cutting device according to claim 1, wherein said resilient means comprises a coil spring.

* * * * *